Sept. 16, 1958     C. E. WILKEN     2,852,182
BLOWER
Filed Oct. 20, 1955
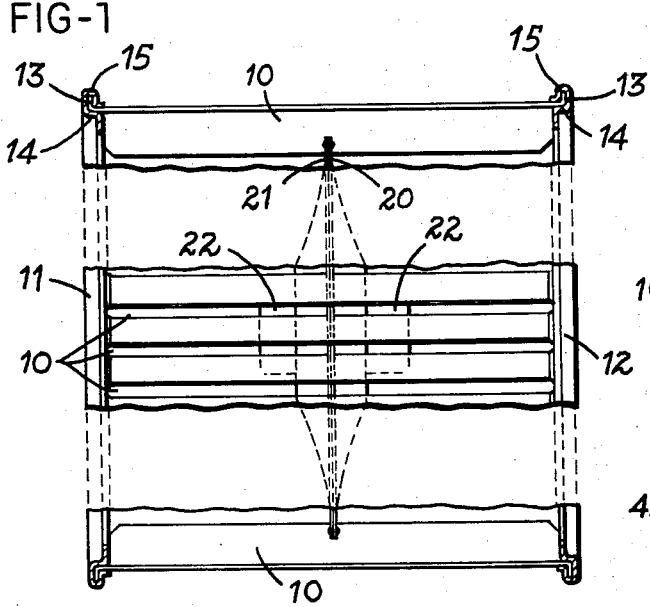
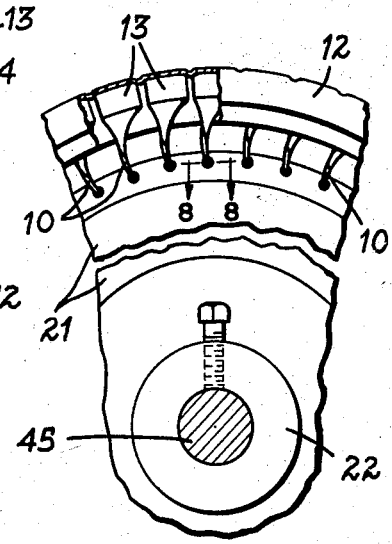
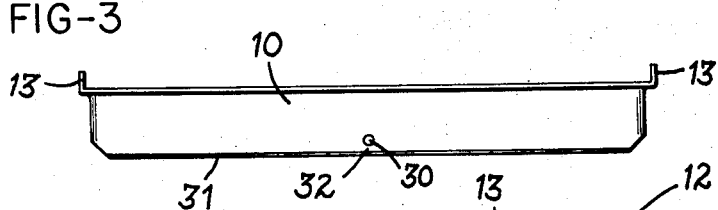
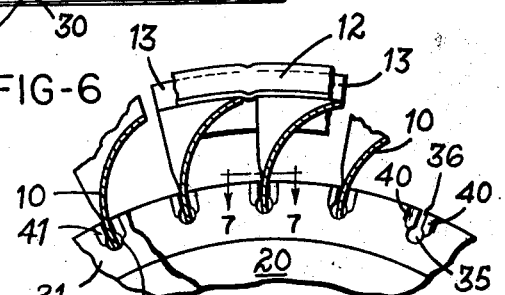
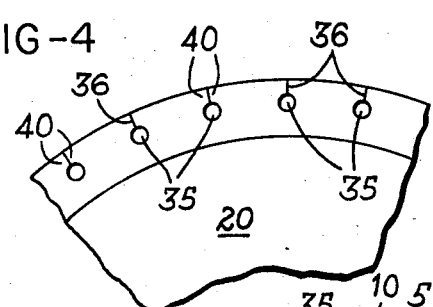
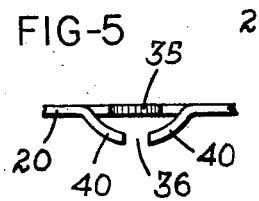
INVENTOR.
CARL E. WILKEN
BY
ATTORNEYS United States Patent Office 2,852,182
Patented Sept. 16, 1958

2,852,182
BLOWER

Carl E. Wilken, New Lebanon, Ohio, assignor to The Lau Blower Company, Dayton, Ohio, a corporation of Ohio Application October 20, 1955, Serial No. 541,679

12 Claims. (Cl. 230—134)

This invention relates to centrifugal blower wheels.

The invention has special relation to blower wheels of the double inlet type wherein a plurality of blades are arranged around the periphery of the wheel in circumferentially spaced relation and held in such relative arrangement by end rings secured to opposite ends of the blades and forming inlets to the interior of the wheel. Such a wheel commonly includes an internal support such as a spider or like disk member, which is connected with the blades and also includes or incorporates a suitable hub by which the wheel is mounted on a driving shaft.

It is a primary object of the present invention to provide a double inlet blower wheel wherein the supporting disk within the interior of the wheel is directly mechanically connected with each blade by a simple and economical integral connection which acts to secure the intermediate portion of the blade in fixed radial relation with the axis of the wheel and to minimize possible deflection of the blades under the centrifugal forces effective thereon in use.

An additional object of the invention is to provide a blower wheel as outlined above wherein the connection between the supporting disk of the wheel and the individual blades does not require welding or like fabricating operations for each blade and which also can be completed after the blades and end rings have been assembled and interconnected to form the cage portion of the wheel.

It is also an object of the invention to provide a novel method of manufacturing a double inlet blower wheel of the above general characteristics which is simple and economical, which facilitates a rapid production rate together with high maintained quality in the finished wheel, and which minimizes the development of undesirable stresses in the finished wheel.

Other objects and advantages of the invention will be apparent from the following description, the accompanying drawing and the appended claims.

In the drawing—

Fig. 1 is a view in side elevation, partly broken away, showing a complete blower wheel constructed in accordance with the invention;

Fig. 2 is an enlarged fragmentary view looking axially of the wheel of Fig. 1 and with parts broken away;

Fig. 3 is a detail view of one of the individual blades incorporated in the blower wheel of Figs. 1 and 2;

Fig. 4 is an enlarged fragmentary view illustrating the construction of one of the supporting disks within the blower wheel of Figs. 1 and 2 at a preliminary stage thereof;

Fig. 5 is an enlarged fragmentary view looking at the edge of the disk of Fig. 4, at a later stage thereof;

Fig. 6 is an enlarged fragmentary section looking axially of the wheel and showing the relationships of the parts at an intermediate stage at the assembly thereof;

Fig. 7 is an enlarged fragmentary section taken generally as indicated by the line 7—7 of Fig. 6;

Fig. 8 is a view similar to Fig. 7 taken generally on the line 8—8 of Fig. 2; and Fig. 9 is a section taken approximately on the line 9—9 of Fig. 8.

Referring to the drawing, which illustrates a preferred embodiment of the invention, Fig. 1 shows a complete blower wheel composed of a plurality of individual blades 10 arranged around the periphery of the wheel and secured together at their respective ends by a pair of end rings 11 and 12. As shown in Fig. 1, each blade includes at each end thereof a radially outwardly extending flange 13, and each end ring includes a shoulder portion 14, which underlies these flanges 13, and a flange portion 15 which is spun over the flanges 13 to secure the blades in the desired assembled relation. This general construction and mode of assembly of a blower wheel is discussed in detail in Wilken Patent 2,537,805 and Wilken et al. Patent 2,651,830, both issued to the assignee of this application on January 9, 1951, and September 15, 1953, respectively.

The blower wheel of Fig. 1 incorporates a supporting intermediate structure which includes a pair of disk members 20 and 21 of sheet metal, and both of these disks are shown as carrying hubs 22 by which the blower wheel is mounted on a drive shaft in use. The disks 20 and 21 are of lesser outer diameter than the inner diameter of end rings 11 and 12 to provide for assembly of the disks within the wheel after the end rings are in place, and it is convenient and economical in manufacture to form these disks out of the central portions of the same blank sheets from which the end rings are cut. In the complete wheel, the disks 20 and 21 combine to form a single supporting unit.

In accordance with the present invention, the disks 20 and 21 are secured in mechanically coupled relation with intermediate portions of all of the blades 10 by interfitting parts which are located entirely within the projected inner diameters of the end rings 11 and 12, and which therefore can be readily assembled and interconnected after the cage portion of the wheel is otherwise complete. As shown in Fig. 2, each blade 10 is provided with a through hole 30 located approximately equidistant its ends and adjacent its edge 31 which lies radially innermost in the finished wheel. The hole 30 is spaced radially outwardly of the blade from its edge 31 by a small marginal portion 32 which may conveniently be of the same minimum radial dimension as the diameter of the hole 30, and satisfactory results have been obtained with each of these dimensions equal to 3/16 inch.

Referring to Fig. 4, the disk 20 is provided initially with a plurality of openings 35 extending through the outer peripheral portion thereof and equal in number to the blades 10. Satisfactory results have been obtained with each of these openings 35 of the same dimension as the holes 30 in the blades and located in similarly spaced relation with the outer periphery of the disk. Each opening 35 is also connected with the outer periphery of the disk by a radially extending slit 36 to provide a pair of tongue portions 40 on either side of each of the slits 36. The disk 21 is preferably identical in construction with the disk 20 and includes similar tongue portions 41 adjacent openings 42 identical with the opening 35.

Prior to assembly of the disks 20 and 21 within the cage portion of the wheel, the tongue portions 40 of disk 20 are deformed axially outwardly of the disk by an amount sufficient to widen each slit 36 until its width is sufficiently greater than the thickness of each blade 10 to permit ready movement of a blade therethrough, as shown in Fig. 5. For example, if the blades are formed of 20-gage sheet stock, satisfactory results have been obtained by forming the tongue portions 40 to a partially cylindrical shape on a radius of substantially one-quarter inch, which has the effect of increasing the width of each slit 36 to approximately 3/32 inch. The disk 21 is similarly treated by deforming the tongue portions 41 thereon to increase the width of the slits 43 therethrough to substantially the same extent as those in the disk 20.

In producing a blower wheel in accordance with the invention, the cage unit composed of the blades and end rings is fabricated first, and this may be done effectively and efficiently by the apparatus and method disclosed in the above noted Wilken et al. patent, with the aid of a fixture of the type shown in that patent which receives and holds the individual blades in the proper position for application of the end rings thereto. Since this part of the manufacturing operation is performed without having the center disks 20 and 21 within the wheel, the holding fixture can be positioned generally centrally of the wheel, rather than to one side of center due to the presence of a supporting disk as shown in the Wilken et al. patent, and it can be proportioned to engage the blades near both ends thereof, which is advantageous as providing improved support and accurate spacing of the blades while the end rings are spun into place, after which the fixture is removed.

To complete the wheel of the invention, the two disks 20 and 21 are assembled on a suitable temporary support, such as the pin or shaft indicated at 45 in Fig. 2, which will hold the disks in axial alignment. The tongue portions 40 and 41 of the two disks 20 and 21 are formed away from the hub portions of the disks so that when the disks are thus assembled with the tongue portions thereon aligned and facing each other, these tongue portions will abut each other as shown in Fig. 7 and thus hold the adjacent disk portions in axially spaced relation. The two disks are inserted in this relation within the cage portion of the wheel by sliding the blades through the aligned pairs of widened slits 36 and 43 until each of the double pairs of tongue portions 40 and 41 are in line with one of the holes 30 through the adjacent blade 10, and this relation of the parts is also shown in Fig. 7. The two disks 20 and 21 are then pressed together, as by flat die members 50 slotted to receive the blades 10, until the tongue portions 40 and 41 are returned to their original positions in coplanar relation with the adjacent portions of the disks, and thus until the peripheral portions of the two disks are substantially in face to face contact. As shown in Fig. 8, this action forces the tongue members to enter into the adjacent holes 30 in the blades 10 from opposite sides of the blade in overlapping relation with the marginal portions 32 of the blades.

The result of these manufacturing operations is to establish firm locking of each blade to the supporting disk unit so that the intermediate portions of all of the blades are thus secured in fixed radial relation with the axis of the wheel. It will be apparent that the configuration and location of the holes in the several blades and of the openings in the disks are subject to variation, but the particular arrangement described above offers definite practical advantages. For example, the tools required to provide circular holes or openings are ordinarily considerably less expensive to produce than for openings of square or other non-circular shape. The use of circular openings in the disks also has the effect of providing tongue portions of maximum strength, since not only does this configuration avoid corners where strains can develop, but each tongue portion is of increasing width away from its end at the adjacent slit 36 or 43 so that it is effectively braced against the radially outwardly applied forces acting thereon in the operation of the finished wheel.

The location of each of the slits 36 or 43 centrally of its associated opening in the disk and extending radially of the disk also has practical advantages. In particular, it provides a pair of tongue portions for each opening which are of equal lengths so that each tongue portion requires a minimum amount of deformation to produce the desired initial widening of the slit for assembly purposes as described, and as contrasted, for example, with a generally rectangular opening having an off-center slit providing a relatively long tongue portion. This slit arrangement also provides for substantially equal penetration of each blade by both of its associated pair of tongue portions and thus correspondingly equalizes the operational load thereon.

It will be apparent that with the parts of the illustrative dimensions given above, the ends of each aligned pair of tongue portions 40 and 41 are theoretically too large to be received in one of the holes 30, but this actually offers a further practical advantage. More particularly, these tongue portions are force fitted into the desired hole with sufficient deformation of these interfitting parts to effect a firm interlock capable of resisting the development of looseness under all operating conditions encountered by the finished blower wheel.

The present invention accordingly provides a variety of important advantages in addition to its basic purpose of assuring that the blades will be securely held against radial displacement during use of the finished wheel. As already noted, improved results are obtained from the standpoint of alignment and support of the blades during the initial fabrication of the cage structure. Another significant practical advantage derives from the fact that blower wheels of the same radial and axial dimensions are commonly used with a variety of shaft sizes, each of which requires a correspondingly different size of hub. When the center disk is assembled in the wheel before the end rings are applied, as in the above noted patents, it is necessary to fabricate and to stock complete wheels with the proper variety of hub sizes. With the present invention, however, a manufacturer is able to fabricate and to stock cages separately from the center disks and hubs, and then to complete fabrication of the wheels by the addition of center disks and hubs of the proper size to fill orders as received.

While the article and method herein described constitute preferred embodiments of the invention, it is to be understood that the invention is not limited to this precise article and method, and that changes may be made therein without departing from the scope of the invention which is defined in the appended claims.

What is claimed is:

1. A double inlet blower wheel of the character described comprising a plurality of blades arranged around the periphery of said wheel, end rings of greater inner diameter than the inner diameter of said blades engaging and retaining the ends of said blades in fixed radial and circumferential spacing, a unitary supporting disk located within said wheel intermediate said end rings and of lesser outer diameter than the inner diameter of said end rings, each said blade having a hole therethrough in axial alignment with the outer periphery of said disk, said disk having a plurality of openings therethrough adjacent the outer periphery thereof and equal in number to said blades, each said opening being connected with the outer periphery of said disk by a slit of substantially less width than the thickness of each said blade to provide substantially coplanar tongue portions of said disk overhanging said openings, and at least one said tongue portion adjacent each said opening being engaged in said hole in the adjacent said blade to secure the intermediate portions of said blades in fixed radial relation with the axis of said wheel.

2. A double inlet blower wheel of the character described comprising a plurality of blades arranged around the periphery of said wheel, end rings of greater inner diameter than the inner diameter of said blades engaging and retaining the ends of said blades in fixed radial and circumferential spacing, a unitary supporting disk located within said wheel intermediate said end rings and of lesser outer diameter than the inner diameter of said end rings, each said blade having a substantially circular hole therethrough in axial alignment with the outer periphery of said disk, said disk having a plurality of substantially circular openings therethrough equal in number to said blades and each spaced from the outer periphery thereof by a distance substantially equal to the diameter of said blade holes, each said opening being connected with the outer periphery of said disk by a radial slit of substantially less width than the thickness of each said blade located substantially centrally of said opening to provide a pair of substantially coplanar tongue portions of said disk overhanging each said opening, and each pair of said tongue portions adjacent each said opening being engaged in said hole in the adjacent said blade from opposite sides thereof to secure the intermediate portions of said blades in fixed radial relation with the axis of said wheel.

3. A double inlet blower wheel of the character described comprising a plurality of blades arranged around the periphery of said wheel, end rings of greater inner diameter than the inner diameter of said blades engaging and retaining the ends of said blades in fixed radial and circumferential spacing, a unitary supporting disk located within said wheel intermediate said end rings and of lesser outer diameter than the inner diameter of said end rings, each said blade having a hole extending therethrough in axial alignment with the outer periphery of said disk and spaced from the radially inner edge of said blade by a relatively narrow marginal portion, said disk having a plurality of openings extending therethrough equal in number to said blades and spaced from the outer periphery thereof by a distance substantially equal to the radial dimension of said marginal portion of each said blade, each said opening being connected with the outer periphery of said disk by a slit extending from an intermediate point along the outer periphery of said opening to provide substantially coplanar tongue portions on either side thereof overhanging said opening, each said blade having said marginal portion thereof received in one of said openings in said disk, and said tongue portions of said disk adjoining each said slit being engaged in said hole in the associated said blade from opposite sides of said blade to secure the intermediate portions of said blades in fixed radial relation with the axis of said wheel.

4. A double inlet blower wheel of the character described comprising a plurality of blades arranged around the periphery of said wheel, end rings of greater inner diameter than the inner diameter of said blades engaging and retaining the ends of said blades in fixed radial and circumferential spacing, a pair of unitary supporting disks located within said wheel intermediate said end rings and of lesser outer diameter than the inner diameter of said end rings, the radially outer peripheral portions of said disks being in substantially face to face relation, each said blade having a hole extending therethrough in axial alignment with said outer peripheral portions of said disk and spaced from the radially inner edge of said blade by a relatively narrow marginal portion, said disks having a plurality of aligned pairs of openings extending therethrough equal in number to said blades and spaced from the outer periphery thereof by a distance substantially equal to the radial dimension of said marginal portion of each said blade, each said opening being connected with the outer periphery of the associated said disk by a slit located to provide substantially coplanar tongue portions on either side thereof overhanging said opening, each said blade having said marginal portion thereof received in one of said pairs of openings in said disk, and both of said tongue portions of each said disk adjoining each said slit being engaged in said hole in the associated said blade from opposite sides of said blade to secure the intermediate portions of said blades in fixed radial relation with the axis of said wheel.

5. A double inlet blower wheel of the character described comprising a plurality of blades arranged around the periphery of said wheel, end rings of greater inner diameter than the inner diameter of said blades engaging and retaining the ends of said blades in fixed radial and circumferential spacing, a pair of unitary supporting disks located within said wheel intermediate said end rings and of lesser outer diameter than the inner diameter of said end rings, the radially outer peripheral portions of said disks being in substantially face to face relation, each said blade having a substantially circular hole extending therethrough in axial alignment with said outer peripheral portions of said disk and spaced from the radially inner edge of said blade by a relatively narrow marginal portion, said disks having a plurality of aligned pairs of substantially circular openings extending therethrough equal in number to said blades and spaced from the outer periphery thereof by a distance substantially equal to the diameter of each said blade hole, each said opening being connected with the outer periphery of the associated said disk by a radial slit located substantially centrally of said opening and of substantially less width than the thickness of each said blade to provide substantially coplanar tongue portions on either side thereof overhanging said opening, each said blade having said marginal portion thereof received in one of said aligned pairs of openings in said disk, and both of said tongue portions of each said disk adjoining each said slit being engaged in said hole in the associated said blade from opposite sides of said blade to secure the intermediate portions of said blades in fixed radial relation with the axis of said wheel.

6. The method of fabricating a blower wheel of the character described which comprises the steps of assembling in the form of the wheel a plurality of blower blades each having a hole therethrough located adjacent the inner edge thereof and intermediate the ends thereof, securing end rings on said assembled blades to form a cage, fabricating a unitary supporting disk of lesser diameter than the inner diameter of said end rings and of greater outer diameter than the inner diameter of said blades, piercing a plurality of openings through the outer portion of said disk equal in number to said blades, forming a slit in said disk from each said opening to the outer periphery of said disk and of less width than the thickness of each said blade to provide tongue portions of said disk overhanging said openings, deforming said tongue portions of said disk until the width of each said slit is greater than the thickness of each said blade, inserting said disk within said cage by relative axial movement of said blades through said slits until said deformed tongue portions of said disk are aligned with said holes in said blades, and then reforming said tongue portions of said disk to their original positions in substantially coplanar relation to cause said tongue portions to engage in said holes in the associated said blade and thereby to secure the intermediate portions of said blades in fixed radial relation with the axis of said wheel.

7. The method of fabricating a blower wheel of the character described which comprises the steps of assembling in the form of the wheel a plurality of blower blades each having a hole therethrough located adjacent the inner edge thereof and intermediate the ends thereof, securing end rings on said assembled blades to form a cage, fabricating a unitary supporting disk of lesser diameter than the inner diameter of said end rings and of greater outer diameter than the inner diameter of said blades, piercing a plurality of openings through the outer portion of said disk equal in number to said blades and slitting said disk from each said opening to the outer periphery of said disk to provide a pair of tongue portions of said disk overhanging each said opening, deforming said tongue portions of said disk on each side of each said slit until the width of each slit is greater than the thickness of each said blade, inserting said disk within said cage by relative axial movement of said blades through said slits until said deformed tongue portions of said disk are aligned with said holes in said blades, and then reforming said tongue portions of said disk to their original positions in substantially coplanar relation to cause each pair of said tongue portions to engage in said holes in the associated said blade from opposite sides of said blade and thereby to secure the intermediate portions of said blades in fixed radial relation with the axis of said wheel.

8. The method of fabricating a blower wheel of the character described which comprises the steps of assembling in the form of the wheel a plurality of blower blades each having a substantially circular hole therethrough located adjacent the inner edge thereof and intermediate the ends thereof, securing end rings on said assembled blades to form a cage, fabricating a unitary supporting disk of lesser diameter than the inner diameter of said end rings and of greater outer diameter than the inner diameter of said blades, piercing a plurality of substantially circular openings through said disk equal in number to said blades and spaced radially from the outer periphery of said disk by a distance substantially equal to the spacing of said blade holes from the said inner edges of said blades, slitting said disk radially from the outermost portion of each said opening to the outer periphery of said disk to provide a pair of tongue portions of said disk overhanging each said opening, deforming both said tongue portions of said disk on each side of each said slit until the width of each slit is greater than the thickness of each blade, inserting said disk within said cage by relative axial movement of said blades through said slits until said deformed tongue portions of said disk are aligned with said holes in said blades, and then reforming said tongue portions of said disk member to their original positions in substantially coplanar relation to cause said tongue portions to engage in said holes in the associated said blades from opposite sides of said blade and thereby to secure the intermediate portions of said blades in fixed radial relation with the axis of said wheel.

9. The method of fabricating a blower wheel of the character described which comprises the steps of assembling in the form of the wheel a plurality of blower blades each having a hole therethrough located adjacent the inner edge thereof and intermediate the ends thereof, securing end rings on said assembled blades to form a cage, fabricating a pair of unitary supporting disks of lesser diameter than the inner diameter of said end rings and of greater outer diameter than the inner diameter of said blades, piercing a plurality of openings through the outer portion of each said disk equal in number to said blades and slitting each said disk from each said opening to the outer periphery of said disk to provide a pair of tongue portions of each said disk overhanging each said opening, deforming said tongue portions of each said disk axially thereof on both sides of each said slit until the width of each slit is greater than the thickness of each said blade, inserting said disks within said cage by relative axial movement of said blades through said slits until said deformed tongue portions of said disks are aligned with said holes in said blades and with said deformed portions of said disks in abutting relation to maintain the adjacent portions of said disks in axially spaced relation, and then pressing said spaced portions of said disks axially together until said deformed tongue portions are restored to their original positions in substantially coplanar relation to cause said tongue portions to engage in said holes in the associated said blades and thereby to secure the intermediate portions of said blades in fixed radial relation with the axis of said wheel.

10. The method of fabricating a blower wheel of the character described which comprises the steps of assembling in the form of the wheel a plurality of blower blades each having a hole therethrough located adjacent the inner edge thereof and intermediate the ends thereof, securing end rings on said assembled blades to form a cage, fabricating a pair of unitary supporting disks of lesser diameter than the inner diameter of said end rings and of greater outer diameter than the inner diameter of said blades, piercing a plurality of openings through the outer portion of each said disk equal in number to said blades and slitting each said disk from each said opening to the outer periphery of said disk to provide tongue portions of each said disk overhanging said openings, deforming said tongue portions of each said disk axially thereof until the width of each slit is greater than the thickness of each said blade, inserting said disks within said cage by relative axial movement of said blades through said slits until said deformed tongue portions of said disks are aligned with said holes in said blades and with said deformed portions of said disks in abutting relation to maintain the adjacent portions of said disks in axially spaced relation, and then pressing said spaced portions of said disks axially together until said deformed tongue portions are restored to their original positions in substantially coplanar relation to cause said tongue portions to engage in said holes in the associated said blades and thereby to secure the intermediate portions of said blades in fixed radial relation with the axis of said wheel.

11. A double inlet blower wheel of the character described comprising a plurality of blades arranged around the periphery of said wheel and extending axially thereof, end rings of greater inner diameter than the inner diameter of said blades engaging and retaining the ends of said blades in fixed radial and circumferential spacing, a unitary supporting disk formed from a single sheet of material located within said wheel intermediate said end rings and of lesser outer diameter than the inner diameter of said end rings, each said blade having a hole therethrough located in axial alignment with the outer periphery of said disk and spaced from the inner edge of said blade by a marginal portion of said blade, and said disk having pairs of substantially coplanar portions thereof in opposed relationship peripherally of said disk and spaced apart less than the thickness of said blade engaged in each said hole from opposite sides of each said blade in overlapping relation with said marginal portion thereof to secure the intermediate portions of said blades in fixed radial relation with the axis of said wheel.

12. A double inlet blower wheel of the character described comprising a plurality of blades arranged around the periphery of said wheel and extending axially thereof, end rings of greater inner diameter than the inner diameter of said blades engaging and retaining the ends of said blades in fixed radial and circumferential spacing, a pair of unitary supporting disks located within said wheel intermediate said end rings and of lesser outer diameter than the inner diameter of said end rings, each said blade having a hole therethrough located in axial alignment with the outer periphery of said disks and spaced from the inner edge of said blade by a marginal portion of said blade, and each of said disks having substantially coplanar portions of each thereof in opposed relationship peripherally of said disk and spaced apart less than the thickness of said blade engaged in each said hole from opposite sides of each blade in overlapping relation with said marginal portion thereof to secure the intermediate portions of said blades in fixed radial relation with the axis of said wheel.

References Cited in the file of this patent

UNITED STATES PATENTS

| | | |
|---|---|---|
| 2,537,805 | Wilken | Jan. 9, 1951 |
| 2,626,741 | Osborne | Jan. 27, 1953 |